United States Patent [19]
Yahagi

[11] Patent Number: 5,694,252
[45] Date of Patent: Dec. 2, 1997

[54] ZOOM LENS

[75] Inventor: Satoshi Yahagi, Omiya, Japan

[73] Assignee: Fuji Photo Optical Co., Ltd., Omiya, Japan

[21] Appl. No.: 671,496

[22] Filed: Jun. 27, 1996

[30] Foreign Application Priority Data

Sep. 26, 1995 [JP] Japan .................... 7-273528

[51] Int. Cl.$^6$ .................................. G02B 15/14
[52] U.S. Cl. ............................ 359/684; 359/685
[58] Field of Search ........................ 359/684, 685

[56] References Cited

U.S. PATENT DOCUMENTS 5,202,992  4/1993  Banno et al. ........................ 359/684
5,548,445  8/1996  Yahagi ............................... 359/684

*Primary Examiner*—David C. Nelms
*Assistant Examiner*—Evelyn A. Lester
*Attorney, Agent, or Firm*—Ronald R. Snider

[57] ABSTRACT

In five-constituent lens groups, the fourth lens group from the object side is made as a positive lens. This fourth lens group is moved in order to correct zooming and focusing, while predetermined conditional expressions are satisfied, thereby realizing a zoom lens which can attain a wide angle and a high zoom ratio while favorably correcting various kinds of aberration. This zoom lens has five groups respectively composed of positive, negative, positive, positive, and positive lens groups. At the time of zooming, the first, third, and fifth lens groups G1, G3, and G5 are made stationary, while the second and fourth lens groups G2 and G4 are made movable. As the second lens group G2 is moved in the optical axis direction, the focal length of the whole system is changed. As the fourth lens group G4 is moved in the optical axis direction, the fluctuation in imaging position is corrected and the change in the imaging position due to change in object distance is corrected. This zoom lens satisfies the following conditional expressions:

$-0.5 < f_2/(f_w f_t)^{1/2} < -0.2,\ 1.1 < f_3/(f_w f_t)^{1/2} < 1.4,\ 0.4 < f_3/f_1 < 0.7,\ 6.0 < f_5/f_3 7.0$

3 Claims, 8 Drawing Sheets

EMBODIMENT 1
WIDE ANGLE END

FIG.3C
DISTORTION
ω=35.5°

FIG.3B
ASTIGMATISM(mm)
ω=35.3°
—— SAGITTAL
---- TANGENTIAL

FIG.3A
SPHERICAL ABERRATION(mm)
F=1.63
g
d

ZOOM LENS

RELATED APPLICATIONS

This application claims the priority of Japanese Patent Application No. 7-273528 filed on Sep. 26, 1995, which is incorporated herein by reference.

BACKGROUND OF THE INVENTION

1. Field of the Invention

The present invention relates to a zoom lens and, in particular, to a zoom lens with a wide angle and a high variable power ratio of 18 to 20 used in home video cameras and electronic still cameras.

2. Description of the Prior Art

As the imaging size of zoom lenses for video cameras is shifting from ⅓ inch to ¼ inch, there has been a demand for simplifying their lens configuration. There has been known an example of such a zoom lens in which the whole system is constituted by four groups, in which, while the first and third lens groups are made stationary, the second lens group is moved in the optical axis direction so as to attain a variable power, and the fourth group moves the image point position in response thereto, thereby satisfying a condition in which F number is 1.6 to 1.8 and a zoom ratio is 8 to 12.

In the above-mentioned prior art, however, the fourth lens group moves such that a convex curve is drawn on the object side from the wide angle side toward the telephoto side, while approaching the third lens group in the medium range. Since a luminous flux directed toward the peripheral portion of the image is emitted from a relatively low position of the fourth lens group in this medium range, its state of aberration may differ from that on the wide angle side or telephoto side, thereby making it difficult to minimize the fluctuation in aberration as a whole.

In particular, when the focal length on the wide angle side is to be made smaller, it is necessary for the fourth lens group to have a high refractive power. Though such a feature is advantageous in that the moving distance of the fourth lens group becomes small, thereby reducing the size of the lens as a whole; the higher the refractive power is, the greater the fluctuation in aberration due to the movement becomes, thereby making it further difficult to correct aberration in the whole zoom range.

Further, in recent years, there has been a strong demand for further increasing the zoom ratio. For example, there is a demand for increasing the zoom ratio to about 20. When the zoom ratio is increased to such an extent, it is necessary for the fourth lens group to have a large amount of movement as that of the second lens group increases. Since the fluctuation in aberration also increases thereby, the correction in the whole zoom range becomes further difficult.

Accordingly, in the above-mentioned configuration, the field angle and zoom ratio have been limited to about 58° and about 12, respectively.

Also, in various kinds of the prior art known heretofore, since the number of lens sheets constituting the zoom lens has already approached the limit for satisfying the above-mentioned various conditions, it has been difficult to attain a high zoom ratio while maintaining their current performances.

SUMMARY OF THE INVENTION

The object of the present invention is to provide a zoom lens which has a wider angle, a higher zoom ratio, and more favorable various kinds of aberration as compared with the prior art.

The zoom lens of the present invention comprises, successively from the object side, a first lens group having a positive refractive power, a second lens group having a negative refractive power, a third lens group having a positive refractive power, a fourth lens group having a positive refractive power, and a fifth lens group having a positive refractive power;

wherein, when zooming, the first lens group, the third lens group, and the fifth lens group are made stationary, while the second lens group and the fourth lens group are made movable;

wherein the focal length of the whole system is changed as the second lens group is moved in the optical axis direction;

wherein the fluctuation in imaging position is corrected and the change in imaging position due to change in object distance is corrected as the fourth lens group is moved in the optical axis direction; and wherein the following conditional expressions (1) to (4) are satisfied:

$$-0.5 < f_2/(f_w \cdot f_t)^{1/2} < -0.2 \quad (1)$$

$$1.1 < f_3/(f_w \cdot f_t)^{1/2} < 1.4 \quad (2)$$

$$0.4 < f_3/f_1 < 0.7 \quad (3)$$

$$0.6 < f_5/f_3 < 7.0 \quad (4)$$

wherein $f_2$: focal length of the second lens group;

$f_w$: focal length of the whole system at the wide angle end;

$f_t$: focal length of the whole system at the telephoto end;

$f_3$: focal length of the third lens group;

$f_1$: focal length of the first lens group; and $f_5$: focal length of the fifth lens group.

Also, at least one of the lens surfaces of the lenses constituting the third lens group is preferably formed by an aspheric surface.

Further, the fifth lens group is desirably constituted by two lenses respectively having positive and negative refractive powers.

Due to the configuration mentioned above, the zoom lens of the present invention overcomes the conventional problems. As the lens group with a positive refractive power which is made stationary at the time of variable power is constituted as the fifth lens group, a wider angle is attained without increasing the refractive power of the fourth lens group, while the fluctuation in aberration due to variable power is suppressed as much as possible. Accordingly, a zoom lens with a wider angle and a higher zoom ratio can be realized.

In order to attain a focal length enabling a wider angle and to perform favorable correction of aberration in the whole zoom range, more correction should be effected on the lens surface as the position of the emitted ray is farther from the optical axis. Accordingly, the fifth lens group which is made stationary at the time of variable power is disposed closest, in the lens system, to the image.

In the following, the conditional expressions defining the refractive powers of the second lens group, third lens group, and first lens group will be explained.

Conditional expression (1) defines the range of refractive power for the second lens group in order to increase the field angle at the wide angle end, indicating the range necessary for performing favorable correction of aberration throughout the whole variable power range and realizing a wide angle, while maintaining a high variable power ratio. Beyond the upper limit of conditional expression (1), though the variable power ratio can be made higher, the image surface is corrected so much that it becomes difficult to attain a balance with respect to spherical aberration. Further, the amount of movement of the second lens group increases so much that the size of the whole system cannot be made small. Below the lower limit of conditional expression (1), by contrast, though the balance in aberration becomes favorable, a wide angle cannot be realized while maintaining a high variable power ratio.

Conditional expression (2) defines the range of the focal length of the third lens group in order to increase the variable power ratio. Beyond the upper limit of conditional expression (2), the refractive power of the third lens group becomes insufficient. When this insufficiency is to be compensated for with the first lens group, it becomes difficult to attain a wider angle. When the insufficiency is to be compensated for with the fourth or fifth lens group, it becomes difficult to attain a necessary back focus. Consequently, it becomes difficult to increase the variable power ratio while maintaining a wide angle. Below the lower limit of conditional expression (2), though a higher variable ratio is attained, the image surface tilts toward the object side at the wide angle end, whereby favorable performances cannot be obtained.

Conditional expression (3) defines the range of the ratio of the focal length of the third lens group to that of the first lens group in order to increase the variable power ratio as in the case of conditional expression (2). Beyond the upper limit of conditional expression (3), it becomes difficult to favorably correct aberration throughout the whole range where the variable ratio can be made greater. Below the lower limit of conditional expression (3), a high variable power cannot be attained.

Conditional expression (4) defines the range of the ratio of the focal length of the fifth lens group to that of the third lens group in order to increase the variable power ratio while maintaining favorable performances throughout the whole zoom ratio. Beyond the upper limit of conditional expression (4), spherical aberration is corrected so much that the image surface tilts toward the under side, whereby favorable performances cannot be attained. Below the lower limit of conditional expression (4), the correction is directed toward the opposite side, whereby favorable performances cannot be attained likewise. Consequently, in order to keep favorable performances while maintaining a wide angle and a high variable power, the ratio of the focal length of the fifth lens group to that of the third lens group must be within the range of conditional expression (4).

Also, when at least one of the lens surfaces of the third lens group is made as an aspheric surface, the number of lens sheets in the whole lens system can be reduced, while aberration, such as spherical aberration in particular, can be favorably corrected. Namely, when the whole lens surfaces of the third lens group are constituted by spherical surfaces, it is necessary to increase the number of lens sheets in order to favorably correct aberration, thereby unfavorably increasing the total length of the lens system.

Further, when the fifth lens group is constituted by two sheets of lenses respectively having positive and negative refractive powers, chromatic aberration in magnification can be easily corrected in the whole range.

DETAILED DESCRIPTION OF THE PREFERRED EMBODIMENTS

In the following, the zoom lens in accordance with embodiments of the present invention will be explained with reference to drawings.

Figure 1:
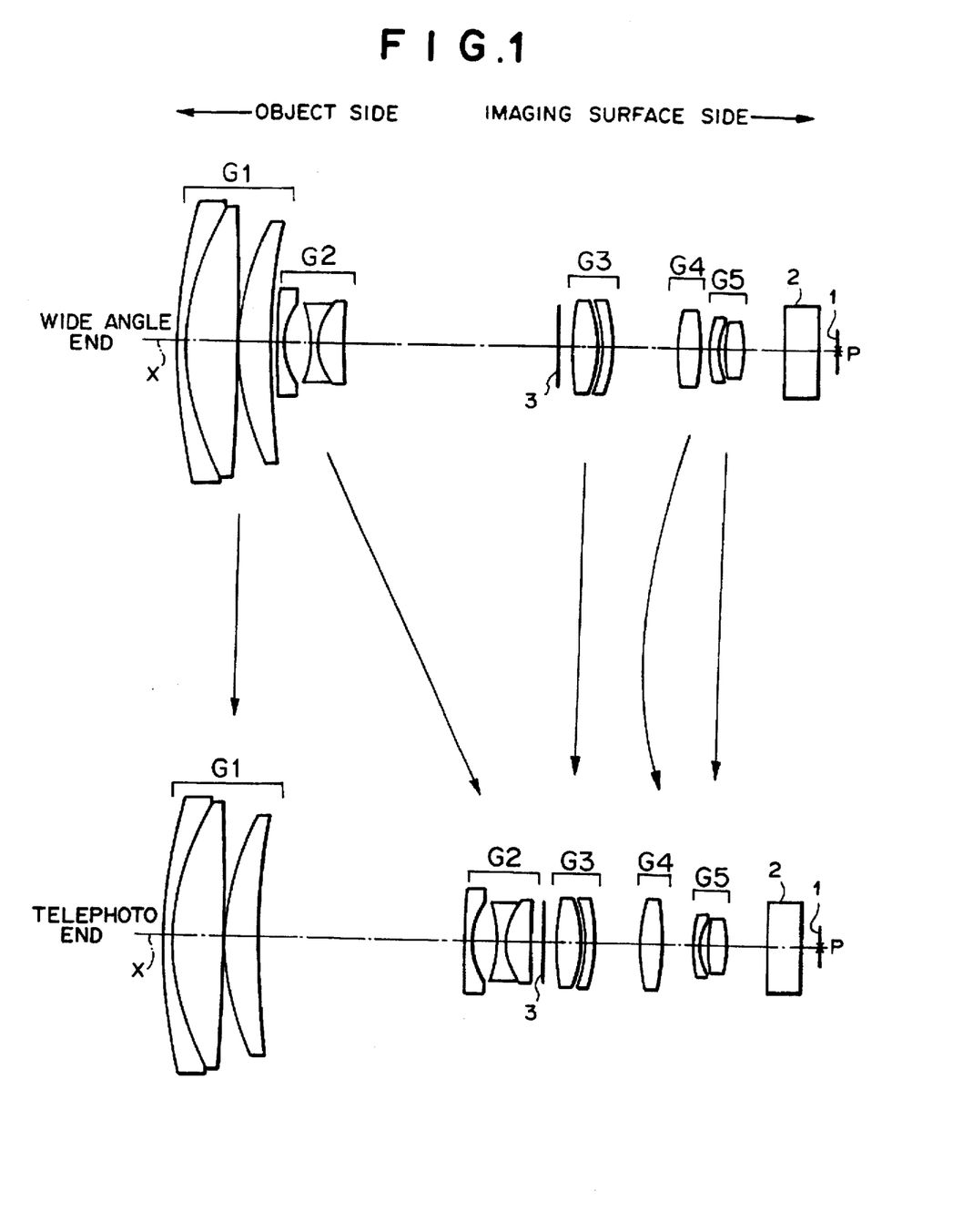
FIG. 1 is a view showing positional relationships between lens groups in a zoom lens in accordance with an embodiment of the present invention at its wide angle end and telephoto end.
Figure 2:
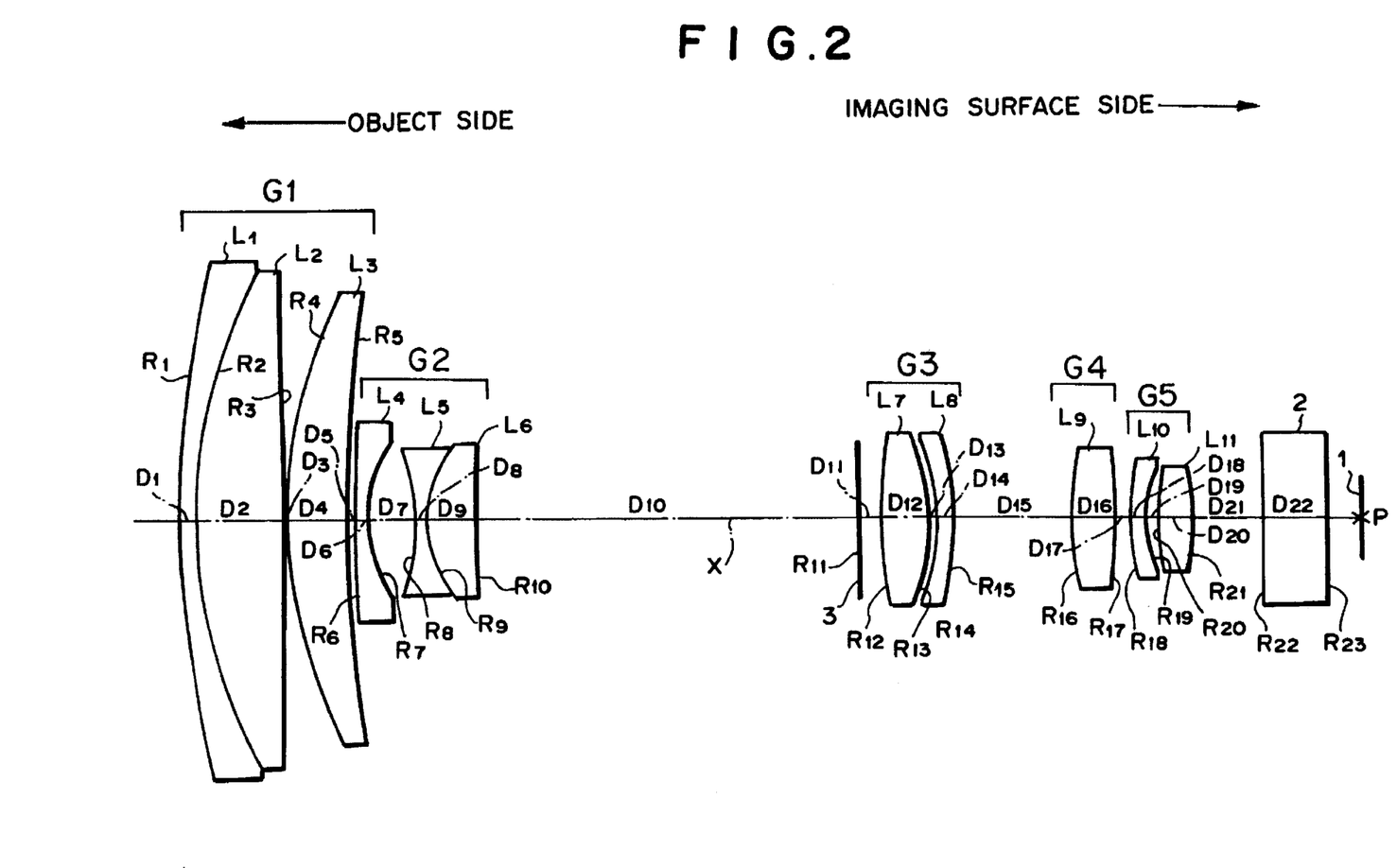
FIG. 2 is a view showing a lens configuration of a zoom lens in accordance with an embodiment of the present invention at its wide angle end.

FIG. 2 is a view showing a lens configuration at the wide angle end, which represents the configurations of the first to third embodiments of the zoom lens in accordance with the present invention; whereas FIG. 1 is a view showing positional relationships between the individual lens groups at the wide angle end and telephoto end.

The depicted zoom lens comprises, successively from the object side, a first lens group G1 having a positive refractive power as a whole, a second lens group G2 having a negative refractive power, a stop 3, a third lens group G3 having a positive refractive power, a fourth lens group G4 having a positive refractive power, and a fifth lens group G5 having a positive refractive power; wherein, when zooming, the first lens group G1, the third lens group G3, and the fifth lens group G5 are made stationary, while the second lens group G2 and the fourth lens group G4 are made movable; wherein focal length f of the whole system is changed as the second lens group G2 is moved along an optical axis X; wherein the fluctuation in imaging position due to the movement of the second lens group G2 is corrected and focusing is effected as the fourth lens group G4 is moved along the optical axis X; and wherein the following conditional expressions (1) to (4) are satisfied:

$$-0.5 < f_2/(f_w \cdot f_t)^{1/2} < -0.2 \qquad (1)$$

$$1.1 < f_3/(f_w \cdot f_t)^{1/2} < 1.4 \qquad (2)$$

$$0.4 < f_3/f_1 < 0.7 \qquad (3)$$

$$6.0 < f_5/f_3 < 7.0 \qquad (4)$$

wherein $f_2$: focal length of the second lens group;

$f_w$: focal length of the whole system at the wide angle end;

$f_t$: focal length of the whole system at the telephoto end;

$f_3$: focal length of the third lens group;

$f_1$: focal length of the first lens group; and $f_5$: focal length of the fifth lens group.

More specifically, the first lens group G1 is constituted by lenses $L_1$ to $L_3$; the second lens group G2 is constituted by lenses $L_4$ to $L_6$; the third lens group G3 is constituted by a lens $L_7$ whose front surface (surface on the object side) is aspherical and a lens $L_8$; the fourth lens group G4 is constituted by a single lens $L_9$; and the fifth lens group G5 is constituted by lenses $L_{10}$ and $L_{11}$.

Between the fifth lens group G5 and an imaging surface 1, a filter for cutting infrared light and a low-pass filter 2 are disposed.

In order to attain a wider angle in the zoom lens, it is necessary for each group to have an appropriate value of refractive power. In particular, in order to attain a focal length of a wide angle and to favorably correct aberration in the whole zoom range, it is necessary to perform more correction on the lens surface as the position of the emitted ray is farther from the optical axis. Accordingly, in the zoom lens of this embodiment, the fifth lens group G5 whose position is stationary at the time of variable power is disposed closest, in the lens system, to the image. Further, the fifth lens group G5 is constituted by two sheets of lenses $L_{10}$ and $L_{11}$ which are made of materials having respective refractive powers whose signs are opposite to each other as well as a difference in their dispersions, in order to make it effective in correcting chromatic aberration in magnification. Their Abbe numbers respectively satisfy the following conditions:

$$\nu+ > 57 \qquad (5)$$

$$\nu- > 57 \qquad (6)$$

wherein $\nu+$ is the Abbe number of the lens $L_{11}$ having a positive refractive power in the fifth lens group G5, whereas $\nu-$ is the Abbe number of the lens $L_{10}$ having a negative refractive power in the fifth lens group G5.

In the following, each embodiment will be explained in detail.

First, radius of curvature R (mm) of each lens surface, center thickness of each lens and air gap between neighboring lenses (collectively referred to as "axial spacing" hereinafter) D (mm), refractive index N and Abbe number $\nu$ of each lens at d line in the zoom lens in accordance with the first embodiment are shown in Table 1.

The numbers in the table successively increase from the object side. Also, in the column for radius of curvature R in this table (also in Tables 3 and 5 shown later), "Aspheric surface" refers to an aspherical form computed by the following expression (A):

$$Z = CY^2/\{1+(1-KC^2Y^2)^{1/2}\} + A_2Y^4 + A_3Y^6 + A_4Y^8 + A_5Y^{10} \qquad (A)$$

wherein Z is the length (mm) of a perpendicular drawn from a point on the aspheric surface having a height Y from the optical axis to a tangential plane (plane perpendicular to the optical axis) of the apex of the aspheric surface; C is the paraxial curvature of the aspheric surface; Y is the height (mm) from the optical axis; K is the eccentricity; and $A_2$ to $A_5$ are aspherical coefficients of the fourth, sixth, eighth, and tenth orders, respectively.

Also, Table 2 shows values of $GD_1$, $GD_2$, $GD_3$, and $GD_4$ in the column for axial spacing D in Table 1 at their wide angle and telephoto end positions. Further, the lower portion of Table 2 indicates focal length f, F number ($F_{NO}$), and field angle $2\omega$ of the whole system, as well as values of the respective constants C, K, and $A_2$ to $A_5$ of the aspheric surface indicated by the above-mentioned expression (A).

Figure 3A:
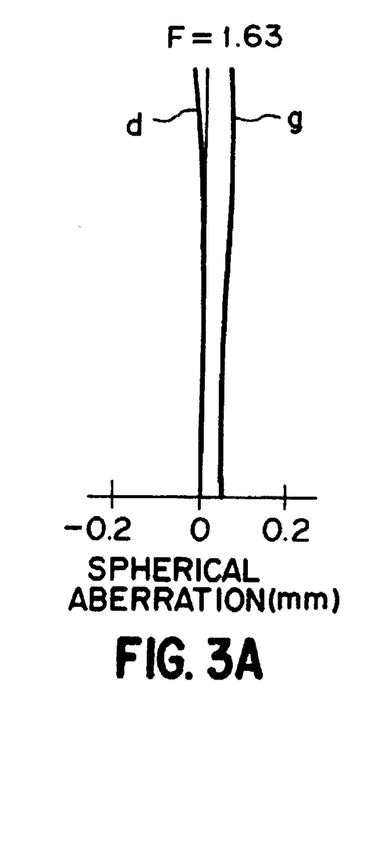
FIG. 3 is an aberration chart showing various kinds of aberration of the zoom lens in accordance with the first embodiment at its wide angle end.
Figure 3B:
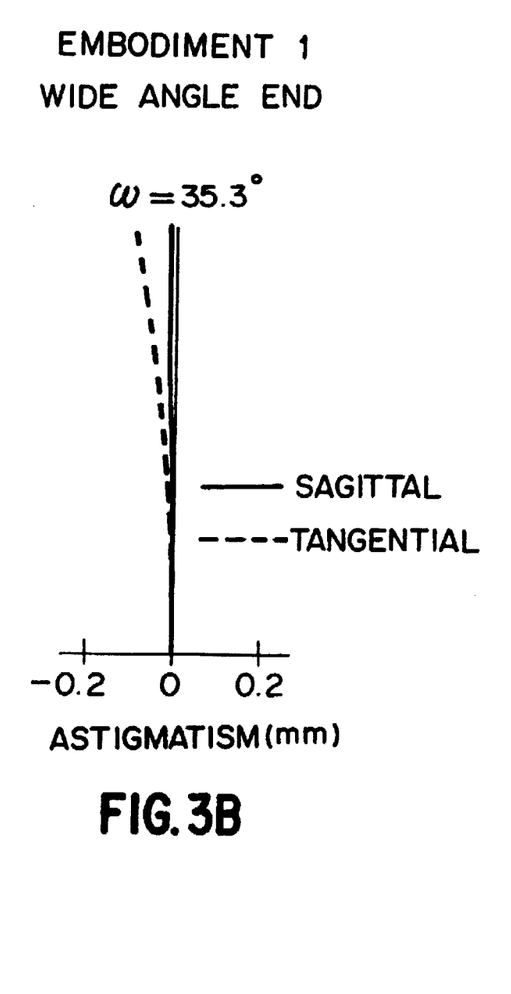
Figure 3C:
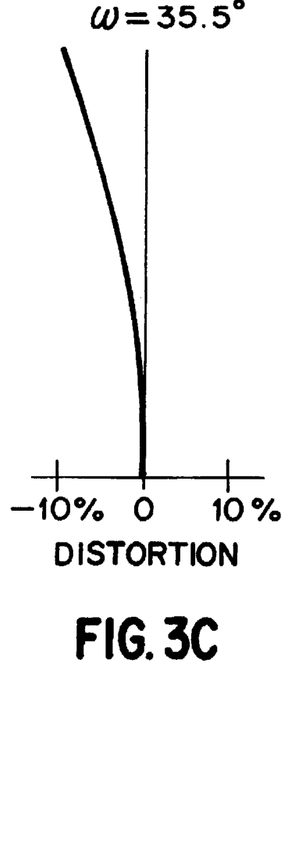
Figure 4A:
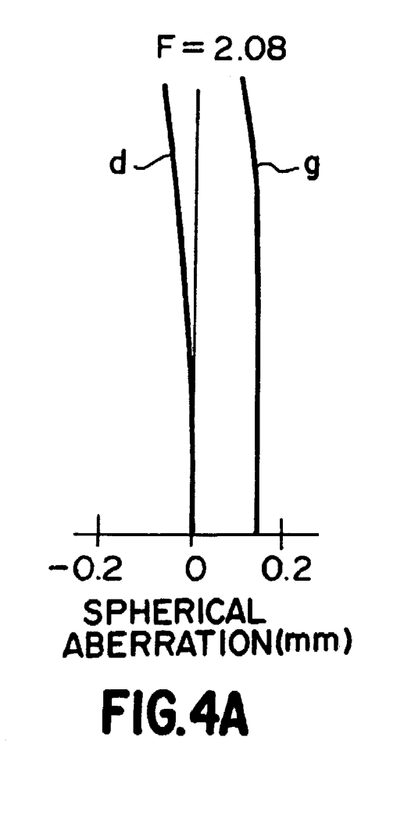
FIG. 4 is an aberration chart showing various kinds of aberration of the zoom lens in accordance with the first embodiment at its telephoto end.
Figure 4B:
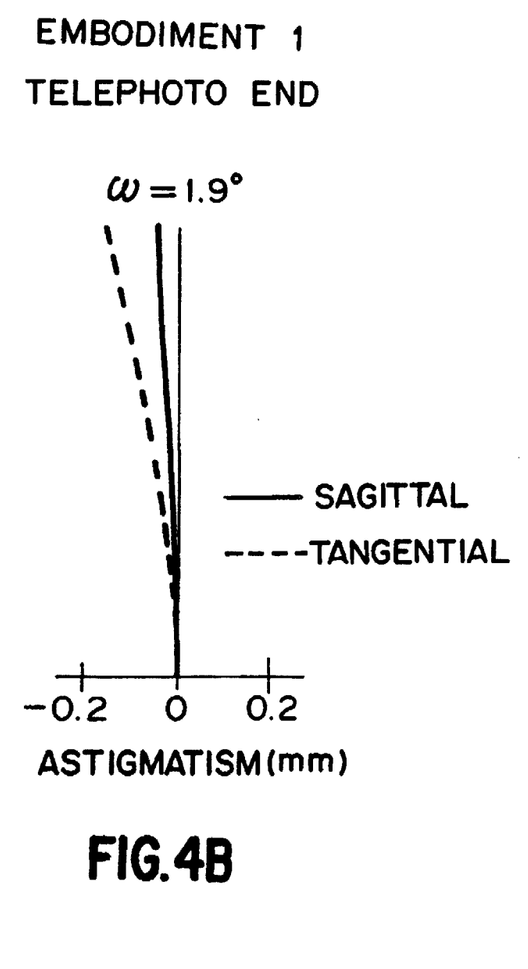
Figure 4C:
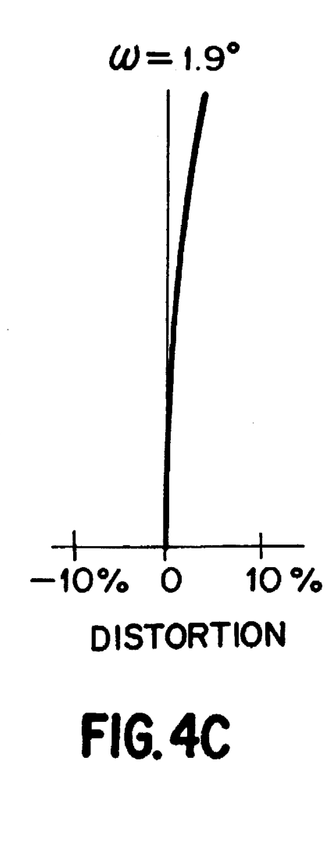

FIGS. 3 and 4 are aberration charts showing various kinds of aberration of the zoom lens in accordance with the above-mentioned first embodiment at its wide angle end and telephoto end, respectively. As can be seen from these charts, in accordance with the zoom lens of the first embodiment, favorable correction of aberration can be effected in the whole zoom range, thereby attaining a wide angle ($2\omega$=70.61 degrees) and a high zoom ratio (18).

Next, for the zoom lens in accordance with the second embodiment, radius of curvature R (mm) of each lens surface, axial spacing D (mm), and refractive index N and Abbe number $\nu$ of each lens at d-line are listed in Table 3.

Also, Table 4 shows values of $GD_1$, $GD_2$, $GD_3$, and $GD_4$ in the column for axial spacing D in Table 3 at their wide angle end and telephoto end positions. Further, the lower portion of Table 4 indicates focal length f, F number ($F_{NO}$), and field angle $2\omega$ of the whole system, as well as values of the respective constants C, K, and $A_2$ to $A_5$ of the aspheric surface indicated by the above-mentioned expression (A).

Figure 5A:
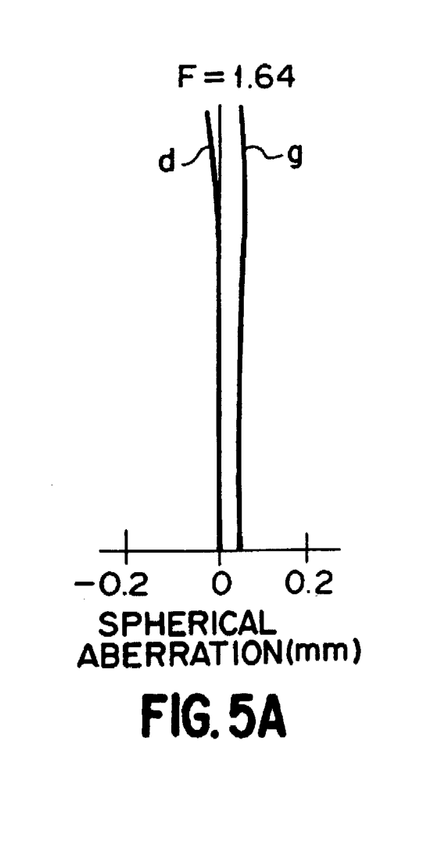
FIG. 5 is an aberration chart showing various kinds of aberration of the zoom lens in accordance with the second embodiment at its wide angle end.
Figure 5B:
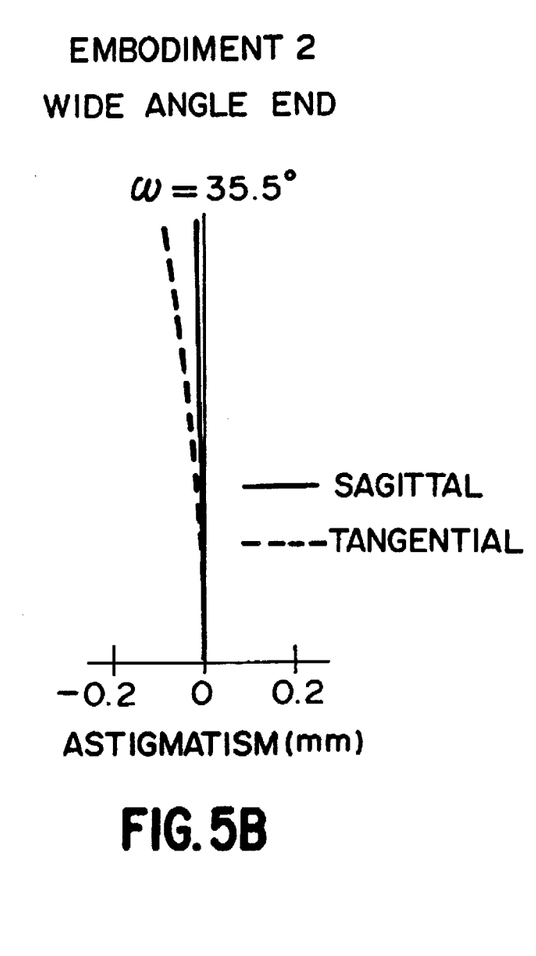
Figure 5C:
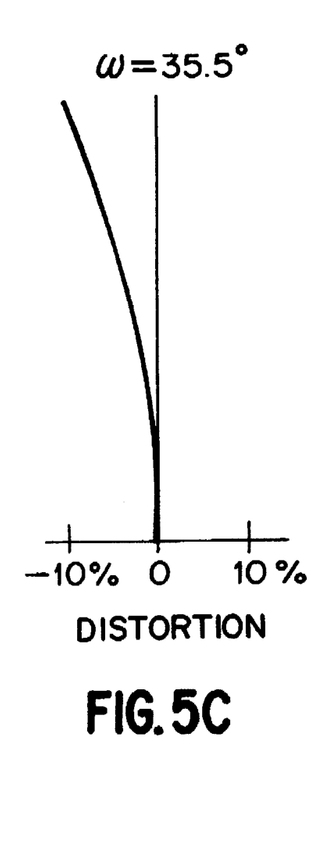
Figure 6A:
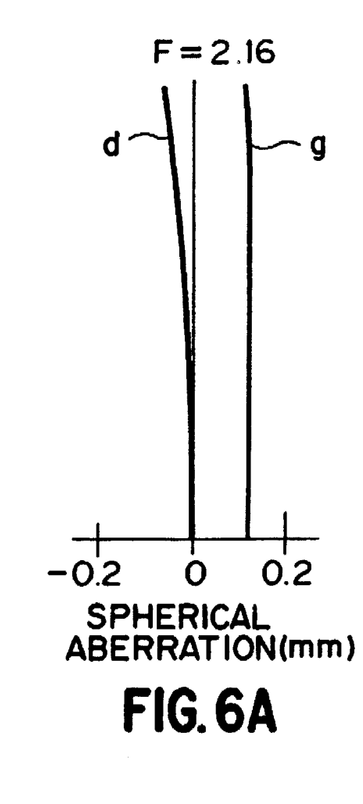
FIG. 6 is an aberration chart showing various kinds of aberration of the zoom lens in accordance with the second embodiment at its telephoto end.
Figure 6B:
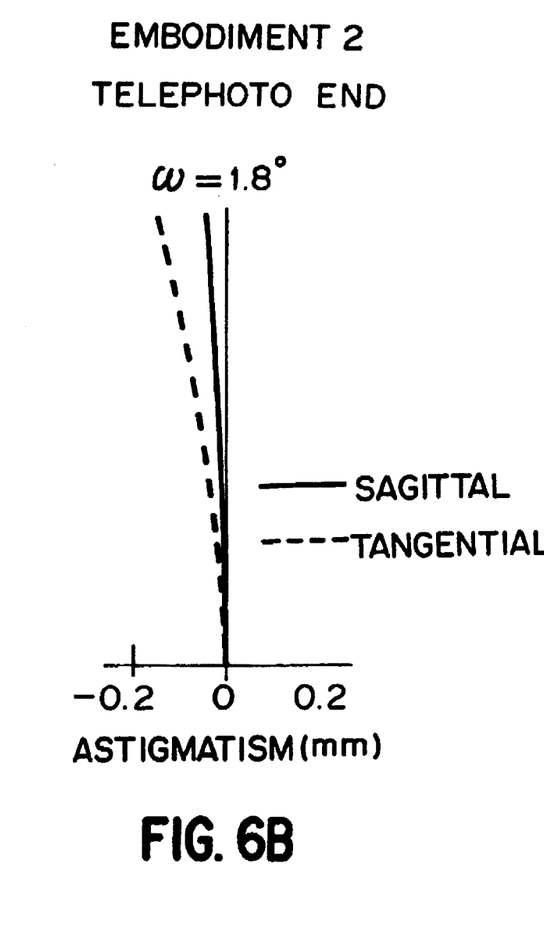
Figure 6C:
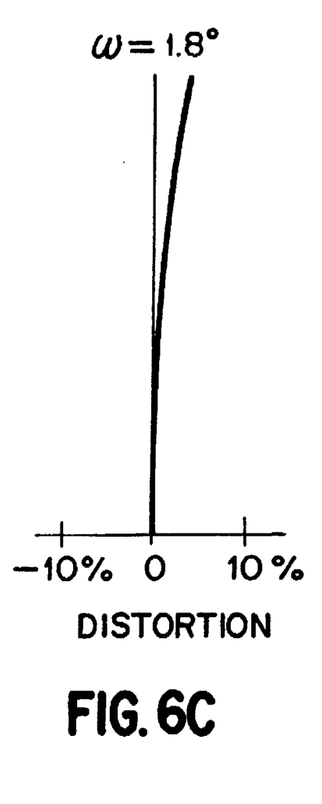

FIGS. 5 and 6 are aberration charts showing various kinds of aberration of the zoom lens in accordance with the above-mentioned second embodiment at its wide angle end and telephoto end, respectively. As can be seen from these charts, in accordance with the zoom lens of the second embodiment, favorable correction of aberration can be effected in the whole zoom range, thereby attaining a wide angle ($2\omega$=71.11 degrees) and a high zoom ratio (19).

Next, for the zoom lens in accordance with the third embodiment, radius of curvature R (mm) of each lens surface, axial spacing D (mm), and refractive index N and Abbe number $\nu$ of each lens at d-line are listed in Table 5.

Also, Table 6 shows values of $GD_1$, $GD_2$, $GD_3$, and $GD_4$ in the column for axial spacing D in Table 5 at their wide angle end and telephoto end positions. Further, the lower portion of Table 6 indicates focal length f, F number ($F_{NO}$), and field angle $2\omega$ of the whole system, as well as values of the respective constants C, K, and $A_2$ to $A_5$ of the aspheric surface indicated by the above-mentioned expression (A).

Figure 7A:
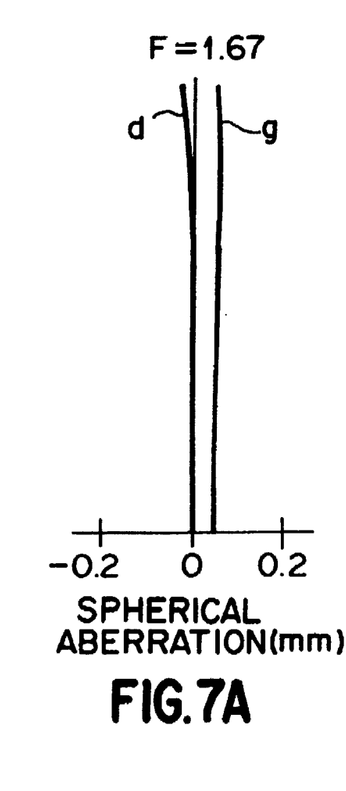
FIG. 7 is an aberration chart showing various kinds of aberration of the zoom lens in accordance with the third embodiment at its wide angle end.
Figure 7B:
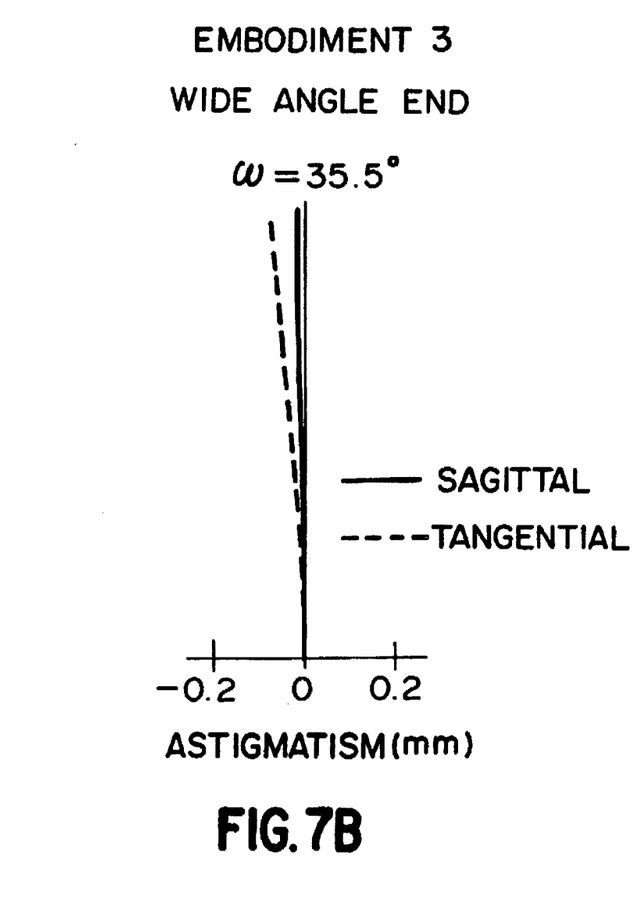
Figure 7C:
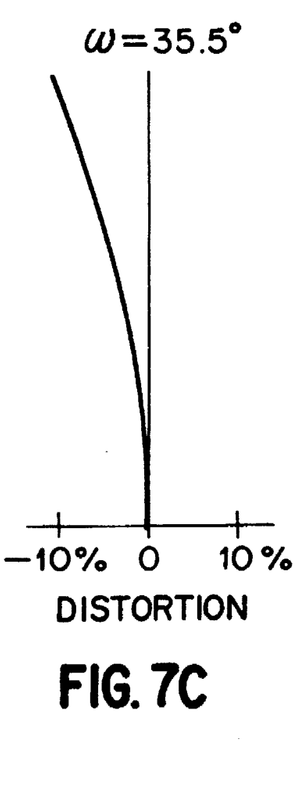
Figure 8A:
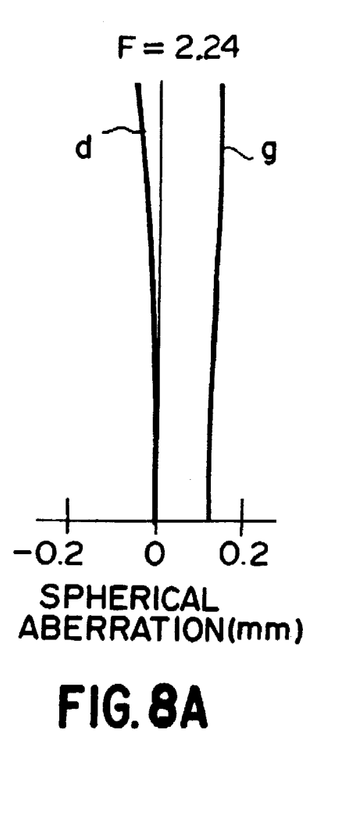
FIG. 8 is an aberration chart showing various kinds of aberration of the zoom lens in accordance with the third embodiment at its telephoto end.
Figure 8B:
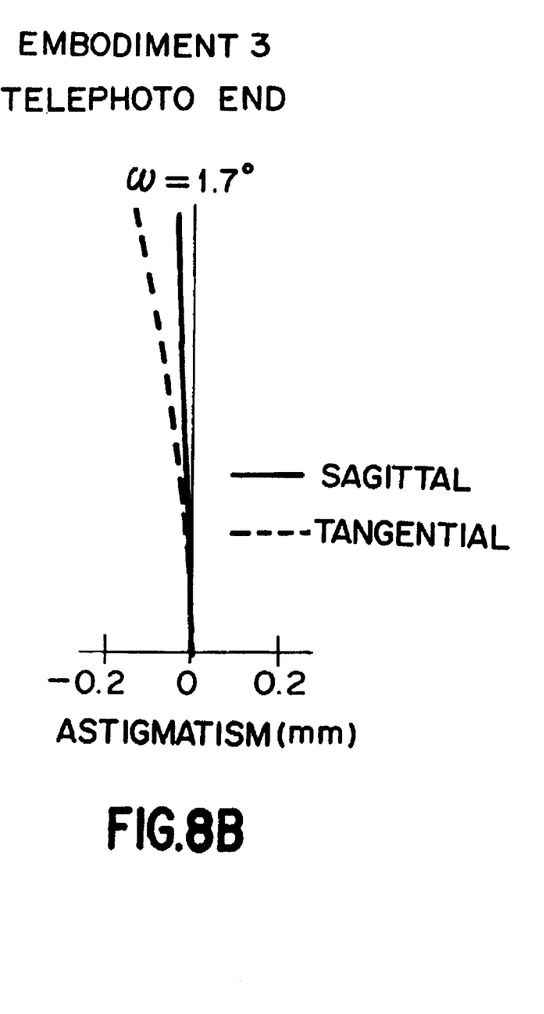
Figure 8C:
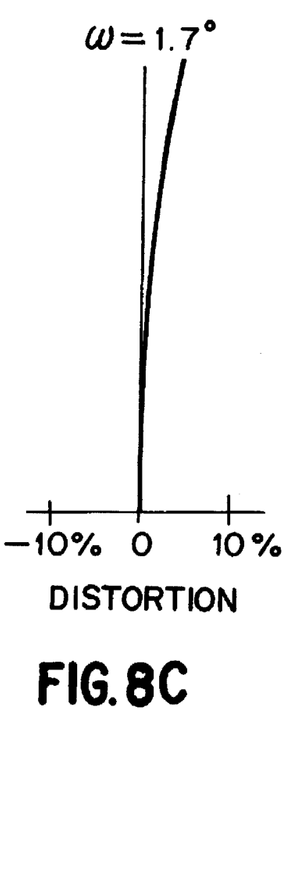

FIGS. 7 and 8 are aberration charts showing various kinds of aberration of the zoom lens in accordance with the above-mentioned third embodiment at its wide angle end and telephotographic end, respectively. As can be seen from these charts, in accordance with the zoom lens of the third embodiment, favorable correction of aberrations can be effected in the whole zoom range, thereby attaining a wide angle ($2\omega$=71.15 degrees) and a high zoom ratio (20).

Also, the value of $f_2/(f_w \cdot f_t)^{1/2}$ in the above-mentioned conditional expression (1), value of $f_3/(f_w \cdot f_t)^{1/2}$ in the above-mentioned conditional expression (2), value of f3/f1 in the above-mentioned conditional expression (3), and value of f5/f3 in the above-mentioned conditional expression (4) in each of the above-mentioned embodiment are shown in the following Table 7.

As can be seen from Table 7, the zoom lens of each embodiment satisfies each of the above-mentioned conditional expressions (1), (2), (3), and (4).

Also, as can be seen from the following Table 8 showing Abbe numbers of predetermined lenses in each embodiment, the zoom lens of each embodiment satisfies the above-mentioned conditional expressions (5) and (6), thereby enabling favorable correction of chromatic aberration.

Table 8

Without being restricted to the foregoing embodiments, the zoom lens of the present invention can be configured in various manners. For example, the number and form of lenses constituting each lens group can be selected appropriately.

As explained in the foregoing, the zoom lens of the present invention can attain a wide field angle of 70° or greater at its wide angle end and a high zoom ratio of about 18 to 20, while favorably correcting various kinds of aberration, thereby realizing a wide angle and a high zoom ratio.

TABLE 1

| M | R | D | N | ν |
|---|---|---|---|---|
| 1 | 58.303 | 0.95 | 1.92516 | 19.1 |
| 2 | 28.319 | 5.48 | 1.69807 | 52.6 |
| 3 | -386.331 | 0.11 | | |
| 4 | 27.662 | 3.56 | 1.83763 | 41.1 |
| 5 | 80.527 | $GD_1$ | | |
| 6 | 109.004 | 0.66 | 1.82409 | 44.3 |
| 7 | 7.666 | 2.90 | | |
| 8 | -10.751 | 0.64 | 1.74966 | 47.1 |
| 9 | 6.311 | 2.90 | 1.80786 | 26.2 |
| 10 | 116.125 | $GD_2$ | | |
| 11 | Stop | 1.38 | | |
| 12 | Aspheric surface | 2.76 | 1.61418 | 60.4 |
| 13 | -12.497 | 0.41 | | |
| 14 | -12.037 | 0.95 | 1.86662 | 22.6 |
| 15 | -18.142 | $GD_3$ | | |
| 16 | 18.903 | 2.39 | 1.60011 | 61.4 |
| 17 | -30.493 | $GD_4$ | | |
| 18 | 17.019 | 0.85 | 1.82102 | 25.1 |
| 19 | 6.783 | 0.64 | | |
| 20 | 12.903 | 2.10 | 1.48400 | 57.9 |
| 21 | -12.903 | 1.00 | | |
| 22 | ∞ | 3.70 | 1.51633 | 64.0 |
| 23 | ∞ | | | |

TABLE 2

| Group distance | Wide angle end | Telephoto end |
|---|---|---|
| $GD_1$ | 0.53 | 21.93 |
| $GD_2$ | 22.73 | 1.33 |
| $GD_3$ | 6.88 | 4.60 |
| $GD_4$ | 1.00 | 3.28 |

$f = 3.52 - 63.48$
$F_{NO} = 1.63 - 2.08$
$2\omega = 70.61° - 3.82°$
$C = 0.044516$
$K = -3.4394296$
$A_2 = -0.1035117 \times 10^{-3}$
$A_3 = -0.224568 \times 10^{-6}$
$A_4 = 0.3902233 \times 10^{-8}$
$A_5 = 0.193347 \times 10^{-12}$

TABLE 3

| M | R | D | N | ν |
|---|---|---|---|---|
| 1 | 54.192 | 0.95 | 1.93603 | 18.5 |
| 2 | 29.137 | 5.32 | 1.72258 | 51.4 |
| 3 | -590.325 | 0.11 | | |
| 4 | 28.051 | 3.40 | 1.81803 | 43.0 |
| 5 | 71.739 | $GD_1$ | | |
| 6 | 93.501 | 0.66 | 1.82161 | 44.4 |
| 7 | 7.791 | 2.89 | | |
| 8 | -10.585 | 0.64 | 1.76494 | 45.3 |
| 9 | 6.330 | 2.88 | 1.82037 | 26.3 |
| 10 | 120.325 | $GD_2$ | | |
| 11 | Stop | 1.38 | | |
| 12 | Aspheric surface | 2.76 | 1.61044 | 60.6 |
| 13 | -12.447 | 0.41 | | |
| 14 | -12.089 | 0.95 | 1.86765 | 22.5 |
| 15 | -17.934 | $GD_3$ | | |
| 16 | 18.955 | 2.38 | 1.58865 | 62.0 |
| 17 | -30.836 | $GD_4$ | | |
| 18 | 16.815 | 0.85 | 1.81297 | 25.5 |
| 19 | 6.828 | 0.64 | | |
| 20 | 12.861 | 2.08 | 1.47206 | 60.2 |
| 21 | -12.861 | 1.00 | | |
| 22 | ∞ | 3.70 | 1.51633 | 64.0 |
| 23 | ∞ | | | |

TABLE 4

| Group distance | Wide angle end | Telephoto end |
|---|---|---|
| $GD_1$ | 0.53 | 22.43 |
| $GD_2$ | 23.27 | 1.37 |
| $GD_3$ | 7.13 | 4.92 |
| $GD_4$ | 0.90 | 3.12 |

$f = 3.53 - 66.91$
$F_{NO} = 1.64 - 2.15$
$2\omega = 71.11° - 3.64°$
$C = 0.044096$
$K = -3.4416153$
$A_2 = -0.1038364 \times 10^{-3}$
$A_3 = -0.2256424 \times 10^{-6}$
$A_4 = 0.3901273 \times 10^{-8}$
$A_5 = 0.1918931 \times 10^{-12}$

TABLE 5

| M | R | D | N | ν |
|---|---|---|---|---|
| 1 | 52.147 | 0.95 | 1.94212 | 18.1 |
| 2 | 29.838 | 5.26 | 1.72682 | 51.2 |
| 3 | -542.937 | 0.11 | | |
| 4 | 28.194 | 3.28 | 1.79766 | 45.0 |
| 5 | 65.208 | $GD_1$ | | |
| 6 | 82.704 | 0.66 | 1.82849 | 43.7 |
| 7 | 7.895 | 2.88 | | |
| 8 | -10.533 | 0.64 | 1.77483 | 44.1 |
| 9 | 6.342 | 2.89 | 1.82684 | 26.4 |
| 10 | 128.310 | $GD_2$ | | |
| 11 | Stop | 1.38 | | |
| 12 | Aspheric surface | 2.76 | 1.59981 | 61.0 |
| 13 | -12.402 | 0.41 | | |
| 14 | -12.172 | 0.95 | 1.86152 | 22.8 |
| 15 | -17.694 | $GD_3$ | | |
| 16 | 18.941 | 2.37 | 1.57874 | 62.4 |
| 17 | -31.121 | $GD_4$ | | |
| 18 | 16.706 | 0.85 | 1.82686 | 24.9 |
| 19 | 6.837 | 0.64 | | |
| 20 | 12.800 | 2.04 | 1.46942 | 60.7 |
| 21 | -12.800 | 1.00 | | |
| 22 | ∞ | 3.70 | 1.51633 | 64.0 |
| 23 | ∞ | | | |

TABLE 6

| Group distance | Wide angle end | Telephoto end |
|---|---|---|
| $GD_1$ | 0.53 | 23.06 |
| $GD_2$ | 23.90 | 1.37 |
| $GD_3$ | 7.39 | 5.04 |
| $GD_4$ | 1.02 | 3.37 |

$f = 3.52 - 70.44$
$F_{NO} = 1.68 - 2.24$
$2\omega = 71.15° - 3.46°$
$C = 0.043862$
$K = -3.4401966$
$A_2 = -0.1038386 \times 10^{-3}$
$A_3 = -0.2259916 \times 10^{-6}$
$A_4 = 0.3901238 \times 10^{-8}$
$A_5 = 0.1918904 \times 10^{-12}$

TABLE 7

| Expression | Embod. 1 | Embod. 2 | Embod. 3 |
|---|---|---|---|
| (1) $f_2/(f_w \cdot f_t)^{1/2}$ | -0.4 | -0.4 | -0.3 |
| (2) $f_3/(f_w \cdot f_t)^{1/2}$ | 1.3 | 1.3 | 1.2 |
| (3) $f_3/f_1$ | 0.6 | 0.6 | 0.5 |
| (4) $f_3/f_3$ | 6.4 | 6.3 | 6.9 |

TABLE 8

| Lens | Embod. 1 | | Embod. 2 | | Embod. 3 | |
| --- | --- | --- | --- | --- | --- | --- |
| | $L_{10}$ | $L_{11}$ | $L_{10}$ | $L_{11}$ | $L_{10}$ | $L_{11}$ |
| Abbe number(ν) | 25.1 | 57.9 | 25.5 | 60.2 | 24.9 | 60.7 |

What is claimed is:

1. A zoom lens comprising, successively from an object side, a first lens group having a positive refractive power, a second lens group having a negative refractive power, a third lens group having a positive refractive power, a fourth lens group having a positive refractive power, and a fifth lens group having a positive refractive power;

wherein, when zooming, said first lens group, said third lens group, and said fifth lens group are made stationary, while said second lens group and said fourth lens group are made movable;

wherein focal length of said zoom lens as a whole is changed as said second lens group is moved in an optical axis direction;

wherein fluctuation in imaging position is corrected and change in imaging position due to change in object distance is corrected as said fourth lens group is moved in the optical axis direction; and wherein the following conditional expressions (1) to (4) are satisfied:

$$-0.5 < f_2/(f_w f_t)^{1/2} < -0.2 \tag{1}$$

$$1.1 < f_3/(f_w f_t)^{1/2} < 1.4 \tag{2}$$

$$0.4 < f_5/f_1 < 0.7 \tag{3}$$

$$6.0 < f_5/f_3 < 7.0 \tag{4}$$

wherein $f_2$: focal length of said second lens groups;

$f_w$: focal length of said zoom lens as a whole at a wide angle end thereof;

$f_t$: focal length of said zoom lens as a whole at a telephoto end thereof;

$f_3$: focal length of said third lens group;

$f_1$: focal length of said first lens group; and $f_5$: focal length of said fifth lens group.

2. A zoom lens according to claim 1, wherein at least one lens surface constituting said third lens group is formed by an aspheric surface.

3. A zoom lens according to claim 1, wherein said fifth lens group is constituted by two lenses respectively having positive and negative refractive powers.

* * * * *